United States Patent Office 3,156,658
Patented Nov. 10, 1964

3,156,658
PREPARATION OF URETHANES USING POLY-
CYCLIC POLYAMINE CATALYSTS
George T. Gmitter, Fairlawn Village, Ohio, assignor to
The General Tire & Rubber Company, Akron, Ohio,
a corporation of Ohio
No Drawing. Filed July 11, 1962, Ser. No. 209,245
13 Claims. (Cl. 260—2.5)

The present invention relates to the manufacture of urethanes and more particularly relates to the use of polycyclic polyamine catalysts in the preparation of polyurethanes by the reaction of organic isocyanates with organic hydroxy compounds.

It is well known that isocyanates will react with water, amines, alcohols, phenols, organic acids, and other compounds containing labile hydrogen. Heretofore, a catalyst has been employed with secondary and tertiary alcohols, high molecular weight primary alcohols, or the like, to initiate or control the reaction of the organic hydroxy compound and the isocyanate. Suitable catalysts for preparation of the urethanes include alkyl tertiary amines such as trihexylamine, amino alcohols such as butyl diethanol amine, dialkyl ethanol amines, pyridines, N-alkyl morpholines, and various other acyclic and cyclic tertiary amines as disclosed, for example, in U.S. Patent No. 2,957,832, U.S. Patent No. 2,993,869, and my copending application Serial No. 106,262, filed April 28, 1961.

At present, the most important urethane compounds are produced by reacting a polyisocyanate having 2 to 3 isocyanato groups (such as an aromatic diisocyanate) with a polyhydroxy compound of high molecular weight having preferably 2 to 3 terminal hydroxyl groups. Commerical polyurethanes have been prepared employing as the hydroxy compound polyhydric polyethers, polyhydric polyesters, various polyoxyalkylene glycols and triols, and various other polyhydric alcohols. The polyethers are usually polyalkylene ether glycols or triols, and the polyhydric polyesters are usually obtained by the reaction of a dicarboxylic acid with a polyhydric alcohol such as a triol, diglycol, polyglycol or other glycol. The linear polyether and polyester polyols may be extended further by reaction with an alkylene or arylene diisocyanate producing urethane linkages which contain available hydrogen attached to the nitrogen atom for reaction with more isocyanate. Thus, the chain-extended polymers can be further crosslinked along the chain by use of additional polyisocyanate or water. Rigid, semi-rigid and flexible (elastic) polyurethane foams may be made by using an activator mixture including water and a suitable catalyst and sometimes a small amount of additional diisocyanate. The foams may be made by the prepolymer method or the "one-shot" method. Solid polyurethane elastomers (rubbers) of high molecular weight may also be made which have excellent properties. Polyurethane rubbers have excellent strength and abrasion resistance and may, for example, be used in tires.

The present invention involves the discovery that the reaction between an isocyanate and a hydroxy compound is accelerated by the use of a polycyclic polyamine reaction product of formaldehyde and an alkylene diamine in a molar ratio of about 2 mols of formaldehyde per mol of alkylene diamine, said alkylene diamine having the general formula H₂N—R—NH₂ in which R is an alkylene radical of from 2 to 4 carbon atoms. The preferred catalyst of this invention is a polycyclic polyamine composed of from two to about five units of the general formula

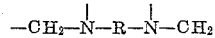

in which each R is an alkylene radical of from 2 to 4 carbon atoms, all the nitrogen valences in said polycyclic polyamine being satisfied by carbon atoms. Each R group is preferably an alkylene radical selected from the group consisting of ethylene, trimethylene and tetramethylene radicals, more preferably ethylene.

A compound of this type can be produced, for example, by condensing an alkylene diamine such as ethylene diamine with formaldehyde in a 1:2 molar ratio respectively forming as a product:

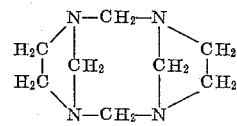

identified as diethylene tetramethylene tetramine.

When trimethylene diamine is condensed with formaldehyde in a respective molar ratio of 1:2, a compound identified as cyclotetramethylene-tetra-hexahydropyrimidine is formed:

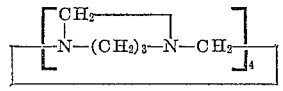

When tetramethylene diamine is condensed with formaldehyde in a respective molar ratio of 1:2, the products include:

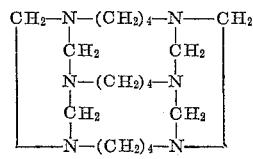

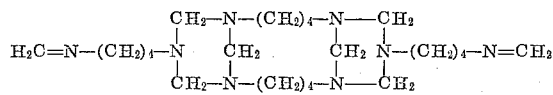

and

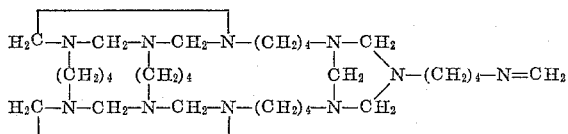

The above compounds are well known. The method of preparing these compounds is disclosed in an article by Krassig: Makromol. Chem. 17; 77–130 (1955). If desired an excess of formaldehyde can be present during the condensation reaction to insure the presence of only tertiary amine groups, but the ratio of reactants in the desired products is two moles of formaldehyde per mol of diamine. Generally, no more than a two-fold molar excess of formaldehyde is used during the condensation reaction.

The above compounds have been found to be exceptional catalysts for polyurethanes. Since the desired reaction between a polyisocyanate and an organic hydroxy compound can be promoted using an amount by weight of such catalyst which is a very small fraction of the amount of typical tertiary amine catalyst, such as N-methyl morpholine or trialkyl amines, and since the catalyst of this invention is many times as reactive as the previously employed typical polyurethane catalysts, the reaction time can be considerably reduced. The catalyst of this invention is also better than typical tertiary amine catalysts for preparation of urethanes since it has very low volatility, high thermal stability, and higher basicity per unit weight of compound. These properties allow more effective use of the compound, a faster cure in polymeric plastics and minimize the time and temperature required for any aftercure. It is thus possible to produce a polymer uncontaminated by thermal dissociation products.

In those reactions between organic hydroxy compounds and isocyanates which, without catalyst, require such high initiation temperatures that control of the ensuing reaction becomes extremely difficult or impossible, the catalyst of the present invention is very important. Such catalyst can, for example, be used advantageously in the typical reactions between arylene diisocyanates and dihydric or higher polyhydric alcohols to form polyurethanes of high molecular weight having long linear chains.

Various isocyanates and hydroxy compounds may be reacted using the catalyst of this invention to promote or accelerate the reaction. Suitable isocyanates include 2,4-tolylene diisocyanate; p-phenylene diisocyanate; diphenyl methane diisocyanate; m-phenylene diisocyanate; butylene-1,4-diisocyanate; 3,3'-dimethoxy-4,4'-biphenylene diisocyanate; benzene triisocyanate; naphthylene-2,4-diisocyanate; 3,3'-dimethyl-4,4'-biphenylene diisocyanate; cyclohexylene diisocyanate; 2-methyl butane-1,4-diisocyanate; and other polyisocyanates listed in U.S. Patent Nos. 2,957,832, 2,993,869 and 3,028,353. Suitable hydroxy compounds which may be reacted with any of the aforesaid isocyanates include glycerol, 1,3,6-hexanetriol, polypropylene ether glycol; polyisopropylene ether glycol; ethylene glycol; hexamethylenediol; propylene glycol; 1,4-butanediol; polyethylene glycol; sorbitol; hydroxy polyesters; cyclohexanediol; or other polyhydric alcohols or hydroxyl-terminated compounds disclosed in the aforesaid patents or my aforesaid application Serial No. 106,262.

Each of the above-mentioned isocyanates can be reacted with any of the above-mentioned hydroxy compounds in the presence of the catalyst of this invention to produce a urethane. In carrying out the reaction, the amount of the isocyanate compound may be selected so that each isocyanato group reacts with a hydroxy group. A slight molar excess of isocyanate may be employed. The concentration of the catalyst of this invention may be as low as 0.1 percent by weight of the polyisocyanate compounds in the reaction mixture especially where the catalyst is employed in conjunction with other common nitrogen base catalysts. Usually the catalyst of this invention allows the reactions to be initiated at room temperature without external heating although moderate heating may sometimes be desirable to speed up the reaction even further.

The catalyst of this invention is particularly important in the manufacture of high molecular weight, crosslinked, urethane polymers, such as elastic rubbers and elastic foams. In order to produce this type of polyurethane, it is usually preferable to employ an organic hydroxy compound in the form of a linear hydroxyl-terminated polyester or polyether having a molecular weight of 1500 to 5000. The active hydroxyl hydrogens available at the ends of the polyether or polyester chain are capable of reacting with diisocyanates to form chain extended compounds having repeated urethane linkages. The favored isocyanate compounds employed for extension of the chains and for the formation of branched polymers are the tolylene, phenylene and naphthylene diisocyanates, particularly the 1,5-naphthylene isomer, the 2,4-tolylene isomer and the 2,6-tolylene isomer. The catalyst of the present invention accelerates the chain extending reaction and also the subsequent crosslinking reaction. The diisocyanate will comprise usually about 15 to about 35% by weight of the polyether or polyester charge. Where a polyisocyanate having three, four or more isocyanato groups is incorporated into the system, the resulting polymer is generally leathery or resinous. However, such a polyfunctional coreactant can be used, for example, in a system to be sprayed as a surface coating wherein a very fast cure is necessary to reduce or prevent runoff of the polymer being formed on the spray-coated surface.

Various methods may be employed to effect the chain extending reaction. One method is to free the hydroxyl-terminated polyether or polyester of water, heat to 100° C., and then to add all of the diisocyanate. An exothermic reaction takes place and is completed in a relatively short period of several minutes. The reaction product is kept free of water to avoid secondary crosslinking reactions prior to final curing. In a modified method, less than the stoichiometric equivalent of the diisocyanate is initially added to the preheated (about 100° C.) and dried polyether or polyester, the remainder being added for the subsequent crosslinking reaction with the hydogen atoms of the formed urethane linkages in adjacent chains.

In the manufacture of polyurethane elastomers according to the method of this invention, it is customary to react one equivalent weight of a long chain linear (polyester or polyether) polyol having 2 to 3 terminal hydroxyl groups and a molecular weight of 1000 to 10,000 with at least 0.8 and usually no more than 12 equivalent weights of an organic (aliphatic or aromatic) diisocyanate. The molar ratio or equivalent weight ratio of isocyanate to polyol is usually 0.9:1 to 6:1 in both the prepolymer and one-shot systems. Such ratio may be in the neighborhood of 1:1 (i.e., 1.1:1 to 1.5:1).

When water is used as a crosslinking agent or to react with an isocyanato group, carbon dioxide gas is evolved, a urea linkage is formed, and the hydrogen atoms of such urea linkage are capable of reacting with unreacted isocyanate to form 3-dimensional crosslinked super molecules. The liberated carbon dioxide gas acts as a blowing agent when water is used as the crosslinking agent in the manufacture of foams. Where hydroxy terminated linear polyethers or polyesters and diisocyanates are used, soft, spongy, elastomeric foams are produced. As the hydroxyl content of the polyether or polyester increases, the foam becomes more rigid. This effect can be achieved with the linear polyethers or polyesters above if a polyisocyanate having three or more isocyanato groups is introduced alone or mixed with diisocyanates.

In crosslinking reactions effected in substantial absence of water, plastic compositions are obtained by molding or casting of the reaction mixture and subsequent curing in situ. The crosslinking reaction is accelerated by very small amounts, often as low as 10 parts per million or less by weight of the hydroxylated component, of a catalyst such as diethylene tetramethylene tetramine. Ordinarily the catalyst is added to the initial reactants and no further catalyst addition will be required for promoting the final cure. If desired, however, and particularly in those instances where the initial catalyst addition is at a minimum, further addition of catalyst can be made in the crosslinking stage by stirring such catalyst into the molten reaction product. When using the catalyst of this invention to accelerate the reaction between a hydroxy compound, such as a polyhydric alcohol or a polyalkylene ether glycol, and an organic diisocyanate, it is preferable to use no more than a small amount of the catalyst (i.e., no more than 2% by weight of said hydroxy compound). Since the reaction becomes too rapid for best practical operations when an amount of catalyst in excess of 1% by weight of the hydroxy compound is employed, it is preferable to use no more than that amount when making foam products.

When making flexible polyester or polyether urethane foams by the prepolymer method the polycyclic polyamine catalyst of this invention can be used to speed up the reaction of the organic diisocyanate and the hydroxyl-terminated polyester or polyether, but it is usually preferable to form the prepolymer without a catalyst. The catalyst of this invention is preferably part of the activator mixture (i.e., water, catalyst and polyfunctional crosslinking agent) added to the prepolymer to effect the foaming reaction. When used in the activator mixture such catalyst accelerates the crosslinking reaction between the terminal isocyanato groups of the viscous polyester or polyether urethane prepolymer and the hydroxyl groups of the water, trimethylol propane, glycerol, hexanetriol, N,N,N',N'-tetrakis (2 hydroxy propyl) ethylene diamine or other hydroxyl-containing crosslinking agent and facilitates production of high quality cellular elastomers. Such prepolymer usually has a viscosity of at least 1500 centipoises (i.e., 2000 to 100,000 centipoises as measured at 25° C. on a Brookfield viscosimeter), and the percentage of free isocyanato groups in the prepolymer is preferably within a predetermined range (i.e., 5 to 15 percent of the total weight of the prepolymer) so that a highly flexible product can be obtained after crosslinking.

While many of the foams prepared when using the prior amine catalysts have an unpleasant odor, the polyurethane foams prepared with the catalyst of this invention do not have such an odor. The comparatively low volatility and excellent stability of the catalyst of this invention affords an added advantage in the preparation of stable molding powders and other "ready-to-use" compositions containing the catalyst in a mixture with the hydroxy compound and other components of the reaction mix.

When making polymers useful as thermoplastic elastomers, insulations and coating compositions, final curing or crosslinking may be effected using compounds other than water such as polyols and amines. It is preferable to employ water, however, when making foams.

The polycyclic polyamine catalyst of this invention will accelerate any reaction between an isocyanate and a hydroxy compound and can be used in the preparation of rigid polyester or polyether urethane foams or solid polyester or polyether urethane elastomers (i.e., polyurethane rubbers of the type disclosed in U.S. Patent No. 3,028,353), but such catalyst is particularly important in the manufacture of flexible (elastic) polyurethane foams.

Such catalyst can be used in a process of making flexible polyester urethane foams or flexible polyether urethane foams (i.e., a process of the type disclosed in my copending application Serial No. 106,262, filed April 28, 1961).

A typical process according to this invention is to react one equivalent weight of a long chain linear polyalkylene ether glycol or triol having a molecular weight of 1500 to 5000 with 0.9 to 6 equivalent weights (preferably about 1.1 to 1.5 equivalent weights) of an alkylene or arylene diisocyanate and water or other crosslinking agents in contact with the polycyclic polyamine catalyst to form the flexible foam or cellular elastomer. If a glycol is employed, it is preferable to employ both water and an organic crosslinking agent such as trimethylol propane or the like having 3 to 15 carbon atoms and 3 to 4 functional groups as disclosed in said application Serial No. 106,262. A triol is usually preferred for the one-shot system. Various high molecular weight triols are suitable. The triol can be a commercial triol of the type disclosed in my copending application Serial No. 810,992, filed May 5, 1959, and now abandoned, such as a propylene oxide adduct of glycerine or other alkylene oxide adducts of simple polyols (i.e., polyhydric alcohols having 3 to 6 carbon atoms).

Processes of making flexible polyester and polyether urethane foams are conventional. The novel catalyst of this invention is suitable for use in such processes. A typical process is to react a polyalkylene ether polyol having 2 to 3 terminal hydroxyl groups with an excess over a molar equivalent of an arylene diisocyanate, a very small amount of a polydimethyl silicone oil, and a small amount of an activator mixture consisting of a tertiary amine catalyst, water and/or a polyfunctional crosslinking agent (such as trimethylol propane). The catalyst of this invention may be used to replace the conventional catalyst in such processes. The amount by weight of the silicone oil is usually no more than 2 percent of the polyether plus diisocyanate. The amount of water required to produce a high quality elastic foam is usually in the range of 0.5 to 2.5 percent and preferably is no more than 5 percent of the total weight of polyether plus diisocyanate.

The amount of the crosslinking agent may be about 1 to 6 percent and is usually no more than 10 percent of the total weight of polyether plus isocyanate, although greater amounts may be used when making rigid or semi-rigid foams.

It will be understood that the amounts of the ingredients used is well known in the art and may be varied considerably, the present invention being concerned with a novel catalyst rather than the amounts of materials to be employed with such catalyst.

The following examples are merely illustrative and are not intended to limit this invention the scope of which is properly delineated in the appended claims. Unless otherwise stated all measurements are in parts or percentages by weight.

Example I 4.4 moles of paraformaldehyde were suspended in dimethylformamide at 80° C., and 1.7 moles of ethylene diamine were slowly added. The reaction mixture was heated for one hour at 100° C., cooled to 10° C. and stripped of dimethylformamide and excess formaldehyde by vacuum distillation for about 16 hours at 30° C. The precipitate was recrystallized out of benzene producing diethylene tetramethylene tetramine.

Example II

The following ingredients were mixed together at room temperature and poured into an open mold:

| | Parts |
|---|---|
| Polyether triol [1] | 100 |
| Silicone block copolymer [2] | 0.06 |
| Stannous octoate | 0.133 |
| Diethylene tetramethylene tetramine | 0.2 |
| Water | 3.5 |
| 80/20 toluene diisocyanate [3] | 45 |

[1] A propylene oxide adduct of glycerine having an average molecular weight of about 3000 and an average hydroxyl number of 56 (Union Carbide "LG-56" Triol).
[2] A liquid silicone block copolymer having the general formula $C_2H_5Si\{O[CH_3]_2SiO]_6-(C_nH_{2n}O)_x-C_4H_9\}_3$ in which each $(C_nH_{2n}O)_x$ is a mixed polyoxyethylene-oxypropylene block containing about 17 oxyethylene and 13 oxypropylene units and in which $n$ is 2 or 3 and $x$ has an average value of about 30.
[3] A mixture of 80% by weight of toluene 2,4-diisocyanate and 20% by weight of toluene 2,6-diisocyanate.

The materials reacted without external heating to produce an elastic polyurethane foam having a density of 2.8 pounds per cubic foot, a tensile strength of 17.4 pounds per square inch, a tear strength of 2.2 pounds per inch, and an elongation at break of 237%.

Example III

The following ingredients were mixed together at room temperature and poured into an open mold:

| | Parts |
|---|---|
| The polyether triol employed in Example I | 100 |
| The silicone block copolymer employed in Example I | 0.9 |
| Stannous octoate | 0.4 |
| N-methyl morpholine | 0.6 |
| Diethylene tetramethylene tetramine | 0.075 |
| Water | 3.5 |
| The toluene diisocyanate mixture employed in Example I | 45.0 |

The materials reacted without external heating to produce an elastic polyurethane foam having a density of 1.82 pounds per cubic foot, a tensile strength of 18.9 pounds per square inch, a tear strength of 3.2 pounds per inch, and an elongation at break of 330%.

*Example IV*

The following ingredients were mixed together at room temperature and poured into an open mold:

| | Parts |
|---|---|
| Polyalkylene ether triol [1] | 100 |
| The silicone block copolymer employed in Example I | 1.1 |
| Diethylene tetramethylene tetramine | 0.5 |
| Water | 3.5 |
| The toluene diisocyanate mixture employed in Example I | 47 |

[1] A propylene oxide-ethylene oxide copolymer adduct of glycerine having an average molecular weight of about 3200 and an average hydroxyl number of 56.

The above ingredients reacted without external heating to produce an elastic polyurethane foam having a density of 1.9 pounds per cubic foot, a tensile strength of 19.5 pounds per square inch, a tear strength of 3.0 pounds per inch, and an elongation at break of 295%.

*Example V*

A prepolymer was prepared by reacting 500 parts of a polypropylene glycol having an average molecular weight of about 2000 with 75 parts of meta-phenylene diisocyanate at 90° C. for 1½ hours in a system under a dry nitrogen atmosphere. The resulting prepolymer was cooled to room temperature and was found to have a viscosity of 26° C. of 3900 centipoises and 2.55% isocyanato groups.

The following ingredients were mixed together in a closed flask.

| | Parts |
|---|---|
| The above-prepared prepolymer degassed under vacuum | 100 |
| 1,4-butanediol | 2.5 |
| Diethylene tetramethylene tetramine | 0.1 |

This mixture was poured into a mold and cured for 12 hours at 110° C. producing a rubbery product having a tensile strength of 1900 pounds per square inch and an elongation at break of 415%.

The above examples illustrate the advantages of a tetramethylene tetramine catalyst in the preparation of various polyurethane elastomers. Similar results are attained when the other polycyclic polyamine compounds described above are substituted mol per mol for the diethylene tetramethylene tetramine in Examples II to V. The procedures of Examples II to IV produce high quality flexible polyurethane foams, and the catalysts of this invention for some reason provide remarkable results when used to produce such foams.

The silicone block copolymer used in the above examples is a commercial product which is described in my copending application Serial No. 810,992, filed May 5, 1959, and it will be apparent that other silicone block copolymer may also be used as disclosed, for example, in application Serial No. 790,323, filed February 2, 1959.

While it is preferred to use a silicone block copolymer or a polydialkyl silicone oil in preparing flexible foams, it will be apparent to those skilled in the art that foams may be made without these ingredients.

It is to be understood, that in accordance with the provisions of the patent statutes, the particular procedures set forth herein are presented for purposes of explanation and illustration and that various modifications of said product and procedure can be made without departing from the spirit of the invention.

Having described my invention, I claim:

1. In a process of making a urethane comprising reacting an organic hydroxy compound containing at least two hydroxyl groups with an organic polyisocyanate in the presence of a reaction catalyst, the improvement which comprises employing, as a catalyst in such reaction, a polycyclic polyamine having a structural formula selected from the group consisting of

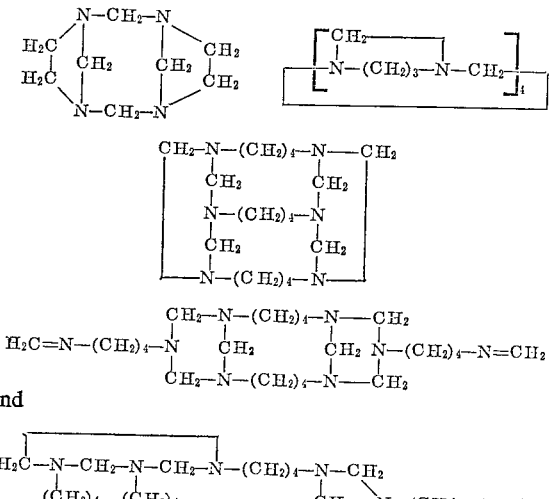

and

2. A process as defined in claim 1 wherein said polyisocyanate is an arylene diisocyanate and said hydroxy compound is a polyester formed by reacting a polyhydric alcohol with a polycarboxylic acid and having a molecular weight of about 1500 to 5000.

3. A method which comprises reacting a hydrocarbon polyisocyanate with a polyhydric alcohol in contact with a catalytic quantity of diethylene tetramethylene tetramine to produce a urethane.

4. A method which comprises reacting a hydrocarbon diisocyanate with a dihydric alcohol in contact with diethylene tetramethylene tetramine to produce a urethane.

5. A method which comprises reacting an aromatic diisocyanate with a linear hydroxy-terminated polyhydric polyether having a molecular weight in the order of 1500 to 5000 in contact with a catalyst to produce a polyether urethane elastomer, said catalyst consisting of diethylene tetramethylene tetramine.

6. The method which comprises reacting an aromatic diisocyanate with a linear hydroxy-endblocked polyhydric polyester having a molecular weight in the order of 1500 to 5000 in contact with a catalytic quantity of diethylene tetramethylene tetramine to produce a polyester urethane elastomer.

7. The method of producing flexible urethane foams which comprises reacting an aromatic diisocyanate, water and a linear polyhydric polyether having a molecular weight in the order of 1500 to 5000 in contact with diethylene tetramethylene tetramine to produce a cellular elastomer.

8. The method of producing flexible urethane foams which comprises reacting an aromatic diisocyanate, water and a linear polyhydric polyester having terminal hydroxyl groups and a molecular weight in the order of 1500 to 5000 in contact with a catalytic quantity of diethylene tetramethylene tetramine.

9. A process of making a flexible polyurethane foam comprising reacting one equivalent weight of a polyether polyol having 2 to 3 terminal hydroxyl groups and a molecular weight of about 1000 to 10,000 with about 0.9 to 12 equivalent weights of an organic diisocyanate and with water in the presence of a catalyst to form a cellular polyurethane elastomer, characterized in that said catalyst is diethylene tetramethylene tetramine.

10. In a process of making a flexible foam comprising reacting one equivalent weight of a polyalkylene ether triol having a molecular weight of 1000 to 10,000 with about 1 to 6 equivalent weights of an organic diisocyanate and with a crosslinking agent, the improvement which comprises carrying out the reaction in the presence of a catalyst comprising diethylene tetramethylene tetramine.

11. In a process of making a cellular elastomer wherein a long-chain polyurethane prepolymer consisting essentially of the reaction product of an organic diisocyanate and a hydroxyl-terminated compound selected from the group consisting of polyesters and polyethers, said prepolymer having terminal isocyanato groups and a viscosity of at least 1500 centipoises, is reacted with water to effect crosslinking, the improvement which comprises carrying out such reaction in the presence of diethylene tetramethylene tetramine.

12. A process of making a flexible polyurethane foam comprising reacting one equivalent weight of a polyester polyol having 2 to 3 terminal hydroxyl groups and a molecular weight of about 1,000 to 10,000 with about 0.9 to 12 equivalent weights of an organic diisocyanate and with water in the presence of a catalyst to form a cellular polyurethane elastomer, characterized in that said catalyst is diethylene tetramethylene tetramine.

13. In a process of making a cellular elastomer wherein a long-chain polyurethane prepolymer consisting essentially of the reaction product of an arylene diisocyanate and a polyalkylene ether glycol having a molecular weight from about 1500 to about 5000 is reacted with water and a crosslinking agent to form a cellular elastomer, the improvement which comprises carrying out such reaction in the presence of diethylene tetramethylene tetramine.

References Cited in the file of this patent
UNITED STATES PATENTS 2,939,851    Orchin  ------------------ June 7, 1960
3,036,021    Trescher  ---------------- May 22, 1962

OTHER REFERENCES

Krassig: "Makromol. Chem." 17; 77–130 (1955).